Dec. 5, 1967  W. E. SPLAIN  3,356,847
X-RAY FILM EXPOSURE MEASURING SYSTEM HAVING
MEANS FOR TERMINATING THE EXPOSURE
Filed July 28, 1965  2 Sheets-Sheet 1

INVENTOR.
WALTER E. SPLAIN
BY
Watts & Fisher
ATTORNEYS

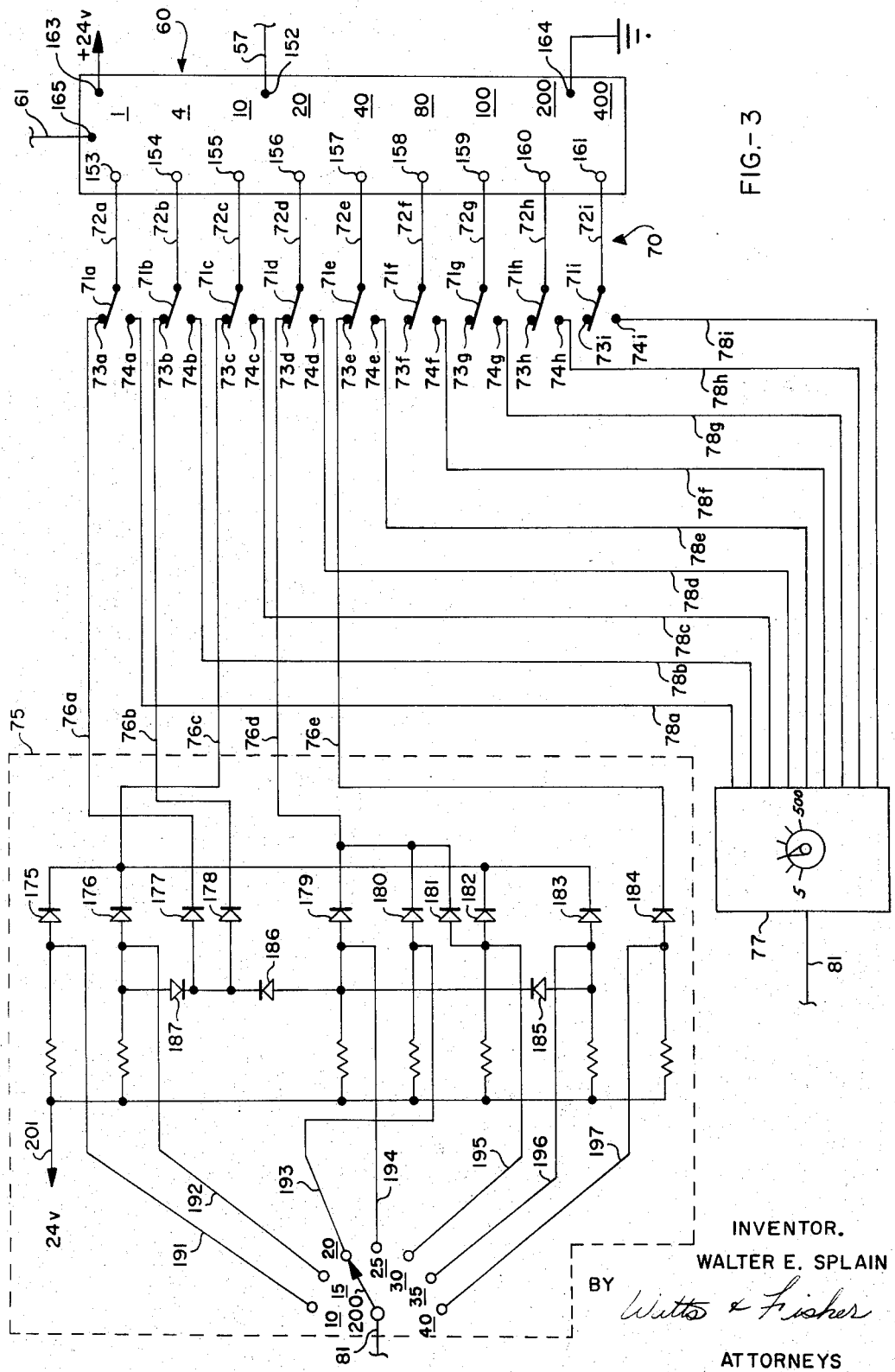

United States Patent Office 3,356,847
Patented Dec. 5, 1967

3,356,847
X-RAY FILM EXPOSURE MEASURING SYSTEM HAVING MEANS FOR TERMINATING THE EXPOSURE
Walter E. Splain, North Olmstead, Ohio, assignor to Picker X-Ray Corporation, Waite Manufacturing Division, Inc., Cleveland, Ohio, a corporation of Ohio
Filed July 28, 1965, Ser. No. 475,604
16 Claims. (Cl. 250—95)

The present application is a continuation-in-part of application Ser. No. 383,015, filed July 16, 1964, entitled "Device for Determining the Current-Time Output of an X-Ray Tube," now Patent No. 3,284,631, issued Nov. 8, 1966.

The present invention relates generally to X-ray apparatuses and and relates more specifically to methods and apparatuses for accurately measuring X-ray exposures.

The present invention will be described in conjunction with radiographic equipment for making X-ray photographs or radiographs. The quality of a radiograph is most often evaluated in terms of the sharpness or definition of each component part of the subject being X-rayed and of the contrast that appears between different parts of different densities. Some of the factors affecting detail and contrast in a resultant radiograph are the milliamperes (MA) in the X-ray tube, the kilovoltage supplied to the terminals of the X-ray tube, the time period of the exposure, and the characteristics of the subject, such as size, thickness, and color.

Two primary methods of controlling the exposure of a radiograph have been developed. One method involves predetermining and then presetting the kilovoltage, milliamperage, and exposure time for the particular subject to be X-rayed. In one suitable control apparatus utilizing this method an operator first sets the kilovoltage level to be used. He then determines the milliampere-seconds, hereinafter referred to as MAS, which he believes will provide a proper film exposure for that particular subject. Finally, he sets either a timer or a milliamperage control on the X-ray apparatus and then adjusts the other control so that a multiple of the two produces the desired MAS. These systems which require preselecting and presetting the milliamperage and the time period of exposure will be referred to hereinafter as MAS systems.

In these MAS control systems, the particular MA and time settings are a matter of judgment by the operator. His judgment must be based upon the information provided to him by the charts, manuals and the like and upon his prior experience. Because of the human element, optimum results are not always obtained with these systems.

A MAS system which permits the total MAS to be set directly by one control is described in the above-referenced original application, Serial No. 383,015. In this MAS system, the X-ray tube current is integrated and digitized to provide a train of output pulses, each pulse representing an identical, predetermined MAS. The exposure of the X-ray film is controlled by counting the output signal pulses and terminating the exposure when the total desired MAS has been reached.

Another method of measuring the X-ray exposure, not having all the human error problems of the MAS systems, determines the amount of X-rays impinging the X-ray film and terminates the exposure when sufficient X-rays have passed through the subject to the film to provide an image of a predetermined density or blackness. These systems are often described as phototiming systems. An example of such a prior phototiming system is disclosed in U.S. Patent 2,821,635 to J. Ball et al.

In these prior phototiming systems, kilovoltage and milliamperage are preselected and preset and a suitable X-ray responsive device is placed behind the subject. The X-ray responsive device provides an output which is indicative of the X-rays passing through the subject to the X-ray film. In the above U.S. patent, the X-ray responsive device includes a fluorescent screen placed behind the subject and a phototube positioned to receive light from the fluorescent screen. The output of the phototube is integrated and triggers a suitable control device to terminate the X-ray exposure when the film reaches an optimum density. A capacitor is often the integrating element and biases a vacuum tube or the like to the state of conduction after receiving a predetermined capacitive charge. The vacuum tube then operates a suitable circuit to terminate the exposure. In the system of the Patent No. 2,821,635 and in other systems using such an integrating capacitor, the capacitor must operate over a wide range of values to cover the range of exposure periods provided by the apparatus. In other words, the length of the exposure period is determined and timed by the amount of charge collected in the capacitor. A different level of charge in the capacitor is used for each different exposure period. The capacitor does not provide optimum results over the entire range of exposure periods, particularly because of the high impedance necessary to prevent large current drain and because of the non-linear characteristics of the capacitor.

It is preferred that an X-ray apparatus have both a MAS control and a phototiming control. The MAS control is sometimes preferred for X-raying small parts of the body, such as the hands, wherein the proper X-ray exposure setting can be relatively accurately determined, and for which the phototiming technique may not be the most exact. The phototiming system is preferable in some instances, as in a "bucky" technique or spot filming technique, particularly for X-raying parts of the torso. Here there are many variables which cannot be always determined in advance so that it is difficult to estimate an exact setting for MA and for time.

Because of the difference in the nature of the prior MAS control systems and the prior phototiming systems, it has not been practicable to combine the systems beyond having them operating the same exposure terminating control in the energization circuit for the X-ray tube. The two prior systems have involved generally different operating concepts and completely different circuit components and elements. This is particularly true since there is a great difference in the level of currents involved in the two systems.

In the preferred system of the present invention, both an MAS control and a phototiming control are provided to terminate the X-ray exposure period. In the MAS control portion of the present system, the X-ray tube current is integrated and digitized to form a successive train of signal pulses or "bits" each of which represents a predetermined MAS. In the phototiming portion of the present system, the phototube current is integrated and digitized to form a successive train of bits, each of which represents an arbitrary degree of density of film exposure. A counting device is selectively connectable to either portion of the present system for counting either the bits produced by the X-ray tube current digitizer or those produced by the phototube current digitizer. A pulse or bit count selector is associated with the counting device and terminates the exposure after a preselected number of the bits are received indicating the desired exposure has been made.

In the present phototiming system, a small integrating capacitor is used. The integrating capacitor is charged and then discharged repeatedly as long as the phototube provides an output current. Each pulse or "bit" provided by a charge and discharge represents a small predetermined integral of phototube current with respect to time. The pulses or bits also represent a predetermined degree of film exposure and density. The size of each bit is such that several bits, preferably 20, are needed to provide an optimum density in the exposed film. Thus, rather than one large and indeterminable degree of capacitive charge as in prior systems, the present phototiming system utilizes several discrete charges and discharges to measure a single exposure. The total charge of the capacitor for each charge and discharge is precisely the same so that each output pulse or bit represents the same identical current-time integral. The integrating capacitor of the present system does not have to operate over a wide range as in the prior systems.

Discrete changes in film density are provided by counting more or less bits before terminating the exposure. The exactness of the exposure is determined, therefore, by the number of bits required to measure the exposure and, consequently, bit size which can be accurately determined. The present system, therefore, is not subject to the inaccuracies inherent in the nonlinear characteristics of the capacitive triggering elements utilized in the prior phototiming systems.

In the preferred phototimer control of the present control system, the phototube current integrator and digitizer has a high input impedance and requires a low current input. It is particularly adapted for receiving the low current output of a phototube.

Accordingly, an object of the present invention is to provide a new and improved control and method for controlling the exposure of an X-ray film.

Other objects and a fuller understanding of the invention may be had by referring to the following description and claims taken in conjunction with the accompanying drawings in which:

FIGURE 3 is a circuit diagram showing the details of part of the pulse count selection system of the X-ray apparatus of FIGURE 1.

Figure 1:
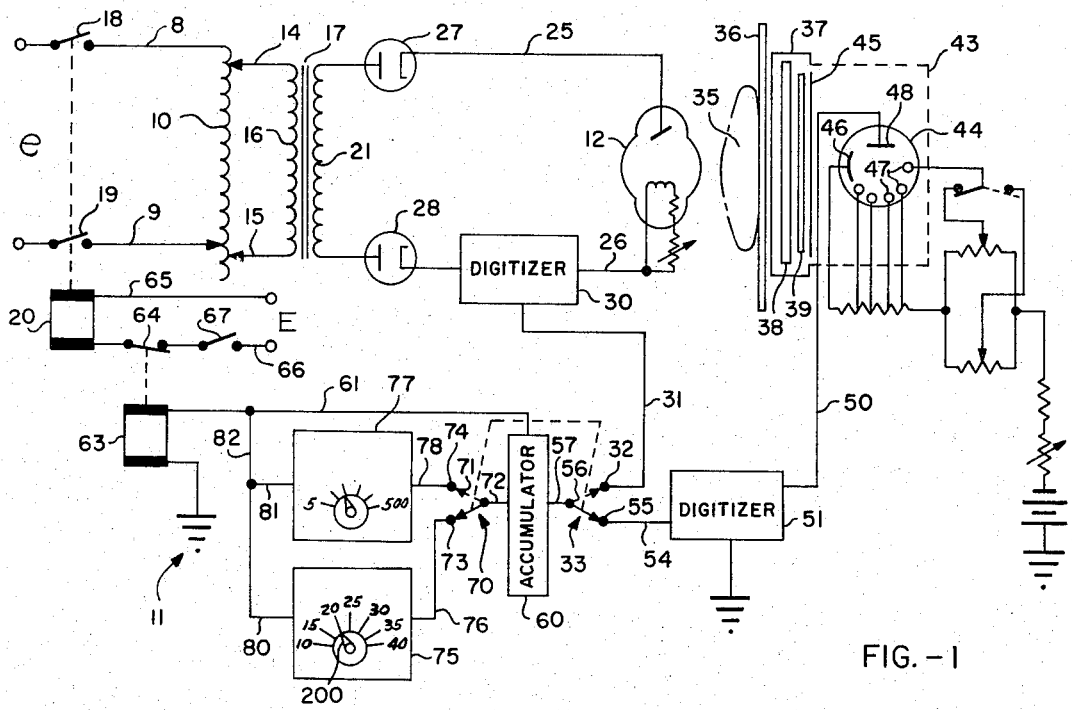
FIGURE 1 is a schematic circuit diagram of the X-ray apparatus of the present invention.

Referring now to the drawings, the X-ray system of the present invention is designated generally by the reference character 11 in FIGURE 1. The X-ray system 11 includes an X-ray tube 12 supplied from an alternating current source "e." A pair of supply conductors 8, 9 connect an autotransformer winding 10 to the supply source e through normally open contacts 18, 19 of a contactor 20. A pair of supply conductors 14, 15 supply a primary winding 16 of a high voltage transformer 17 from variable taps of the autotransformer 10. A secondary winding 21 of the high voltage transformer 17 has its terminals connected to the anode and cathode elements of the X-ray tube 12 via high voltage supply conductors 25, 26. Retifier tubes 27, 28 are interposed in the high voltage supply conductors 25, 26 between the secondary winding 21 and the X-ray tube 12 to provide rectified current to the X-ray tube 12.

An X-ray tube current integrator and digitizer 30 is interposed in the supply conductor 26 between the X-ray tube and the secondary winding 21. The integrator and digitizer 30 is disclosed in complete detail in the referenced co-pending application Ser. No. 383,015, filed July 16, 1964, entitled "Device for Determining the Current-Time Output of an X-Ray tube," now Patent No. 3,284,631, issued November 8, 1966. As disclosed in that application, the digitizer 30 integrates and digitizes the current in the supply conductor for the X-ray tube. An output of the digitizer provides a train of signal pulses to a conductor 31 during the time the X-ray tube 12 is energized. Each signal pulse in the train indicates a predetermined amount of energy in milliampere-seconds (MAS).

The total MAS supplied to the X-ray tube is a product of the number of signal pulses produced by the digitizer 30 during an X-ray exposure and the amount of MAS represented by each pulse, for example, .25 MAS. The conductor 31 connects the output of the digitizer 30 to a fixed contact 32 of a selector switch 33 and conducts the train of signal pulses to the switch 33.

A subject to be X-rayed is indicated schematically at 35. The subject 35 is on a table 36 behind which is a conventional Bucky housing 37 containing a Bucky grid 38 and a film 39. A phototube housing (indicated by the broken lines 43) is attached to the bucky housing 37. The phototube housing 43 carries one or more photomultiplier tubes 44 and a fluorescent screen 45 between the film 39 and the phototube 44. The photomultiplier tube 44 includes the usual cathode element 46, dynodes 47, and anode element 48. The anode element 48 is connected via conductor 50 to the input of a phototube current integrator and digitizer 51. When the X-ray tube 12 is in operation and the phototube 44 is receiving light from the fluorescent screen 45, the digitizer 51 produces a train of substantially identical signal pulses at its output. Each output pulse from the phototube current digitizer 51 represents a predetermined value of exposure of the film 39. In the preferred system shown, the amount of exposure represented by each output pulse from the digitizer 51 is such that substantially twenty pulses provide an optimum density in the film image for most subjects. The details of the phototube current integrator and digitizer 51 are described below.

A conductor 54 connects the output of the phototube current integrator and digitizer 51 to a fixed contact 55 of the selector switch 33. The selector switch 33 includes a movable contact 56 which is selectively positionable at either of the fixed contacts 32, 55 to connect either the output of the X-ray tube current digitizer 30 or the output of the phototube current digitizer 51 to a conductor 57. The selector switch contact 56 is shown in solid engaging the fixed contact 55 and in phantom engaging the fixed contact 32.

The conductor 57 is connected to the input of a pulse accumulator 60. The pulse accumulator 60 is a pulse counting device. Referring to FIGURE 3, the accumulator 60 has an input terminal 152 for receiving the train of output pulses via conductor 57 from either of the digitizers 30, 51, a supply input terminal 163 connected to a positive 24 volt power supply and a ground terminal 164 connected to a ground point. The accumulator 60 further has a plurality of output terminals 153–161 each of which provides an output signal pulse when a different predetermined number of input pulses is received at the input terminal 152. The number of input pulses required to produce an output pulse at a particular terminal is indicated by the underlined numbers 1, 4, 10, 20, 40, 80, 100, 200 and 400, to the immediate right of the terminals 153–161.

A first in a series of pulses received by the terminal 152 results in a positive output signal produced at the terminal 153. The fourth pulse received at terminal 152 results in an output signal at terminal 154. The fifth input pulse results in signals at terminals 153 and 154. A thirty-fifth input pulse results in positive voltage signals at terminals 153–156, and so forth, each fifth input pulse causing positive voltage signals to appear at different combinations of the output terminals 153–161 such that their designated pulse count values add up to the number of pulses in each succession or train of pulses produced by one of the digitizer 30, 51 until the exposure is terminated at which time the accumulator 60 is reset to a zero pulse count value by a reset signal introduced to its reset input terminal 65 via a conductor 66.

In a preferred form, the accumulator comprises a plurality of flip-flop circuits interconnected as a counter. In a standard flip-flop circuit using PNP transistors, the output terminals 153–161 are connected to the collectors of suitable ones of the transistors in the interconnected flip-flop circuits to provide the designated pulse count values 1, 4, 10, 20, 40, 80, 100, 200, 400 underlined on the drawing. The arrangement of the flip-flops is such that when a transistor connected to one of the terminals 153–161 is off, then that terminal is connected to the ground point terminal 64. When the system is reset and all transistors are off, then all of the terminals 153–161 are connected to ground point terminal 64. When the input pulse count begins, then the transistor or transistors turned on by the incoming pulses on conductor 57, connect their associated terminals to the positive 24 volt supply terminal 163 so that positive voltage signals appear at each of the terminals 152–161 required to provide a count of the number of pulses thus far received.

Another suitable accumulator device is currently sold by Picker X-Ray Corporation, Waite Manufacturing Division, Inc., as catalogue 2810 and is entitled, "Digital Scaler."

The output terminals 153–161 of the accumulator are connectable to the inputs of either a film density selector 75 or a MAS selector 77 by a plural conductor and selector switch arrangement indicated schematically in FIGURE 1 and in detail in FIGURE 3. In FIGURE 1, a conductor 72 connects the output of the accumulator 60 to a movable contact 71 of a selector switch 70. The movable contact 71 is positionable to engage either of fixed contacts 73, 74. The fixed contact 73 is connected to the input of the film density control selector 75 via a conductor 76. The fixed contact 74 is connected to the input of the MAS selector 77 via a conductor 78. The movable contact 71 is operatively interconnected to the movable contact 56 so that they are moved together by a single actuator (indicated by broken lines). The movable contact 71 engages the fixed contact 73 when the movable contact 56 engages the fixed contact 55 (shown in solid). The movable contact 71 engages the fixed contact 74 when the movable contact 56 engages the fixed contact 32 (shown in phantom).

When movable contact 56 of the selector switch 33 engages the fixed contact 55 (shown in solid) the accumulator 60 receives a train or succession of pulses from the phototube current digitizer 51. When the movable contact 56 of the selector switch 33 engages the fixed contact 32 (shown in phantom) then the input of the accumulator 60 receives a train of pulses from the output of the X-ray tube current digitizer 30.

As shown in FIGURE 3, the selector switch 70 includes movable contacts 71a–71i connected to the output terminals 153–161 of the accumulator 60 via conductors 72a–72i. The contacts 71a–71i are movable as a unit to engage either fixed phototimer selector input contacts 73a–73i or fixed MAS selector input contacts 74a–74i. The fixed contacts 73a–73e are connected to the phototimer selector 75 via conductors 76a–76e. The fixed contacts 74a–74i are connected to the MAS control selector via conductors 78a–78i.

Referring again to FIGURE 1, the outputs of the selector controls 75, 77 are introduced to a control relay 63 via conductors 80–82. The contactor 20 is connected to a power source E by supply conductors 65, 66. The relay 63 operates a normally closed contact 64 in the supply conductor 66. A normally open, manually operated switch 67 is interposed in the conductor 66 for manually controlling energization of the contactor 20. Closure of the switch 67 energizes the contactor coil 20 when contact 64 is closed to close contacts 18, 19 and apply the line voltage to the primary winding 16 of the high voltage transformer 17. A conductor 61 connects the reset input terminal 165 of the accumulator 60 to the conductor 82. A reset signal is provided to the accumulator 60 whenever either of the selector controls provides an output signal.

The film density control selector 75 has settings ranging from 10 to 40 pulses produced by the phototube current digitizer 51. As described previously, the degree of film exposure represented by each input pulse is such that 20 input pulses will provide the proper density of the film image for most subjects. The selector 75 has a selector switch 200 which is set at a selected pulse count setting, for example, 20 pulses. If this setting does not provide the correct film image density, then the selector switch 200 is moved to either a higher or a lower pulse count setting to provide more or less exposure of the film.

The phototimer control selector 75 includes diodes 175–187 arranged in a multiple current adder (FIGURE 3). As will be seen, several of the diodes in the current adder are AND circuits which require pulse count signals from more than one accumulator output terminal. This is to provide a control signal pulse representing an accumulated pulse count which is a multiple of five and between the pulse count values designated for the output terminals 153–157 of the accumulator 60. Conductors 76a–76e provide the inputs of the current adder 75 with the signal pulses from terminals 153–157 of the accumulator. As shown by the drawing, the terminals 153–157 indicate pulse count values of 1, 4, 10, 20 and 40. Conductors 191–197 are connected to the anodes of those diodes which will provide output pulse count selection in units of 5 from 10 to 40 as is indicated by the numbers 10, 15, 20, 25, 30, 35 and 40 on the selector 75. The movable selector switch 200 is selectively connectable to terminals at the ends of the conductors 191–197 and will provide a control voltage pulse on the conductor 81 when the total number of input pulses received by the accumulator 60 is the number represented by the terminal selected by the switch 200.

Initially, the cathodes of the diodes 175–184 are connected or clamped to ground by the accumulator 60 so that the selector terminals on conductors 191–197 are at substantially zero potential. A positive voltage pulse provided by the accumulator outputs to the cathodes of one or more of the diodes 175–184 will reverse bias such diodes and release the clamping action. The selector switch terminals connected to the anode of the diode or diodes so released will then receive a control pulse from the positive 24-volt supply connected to conductor 201.

For example, a positive control voltage pulse is produced on the conductor 191 from the 24-volt supply connected to conductor 201 when the diode 175 is reverse biased by a positive voltage pulse provided to the cathode of the diode 175 via the conductor 76c from the accumulator terminal 155. The output voltage pulse provided by accumulator output terminal 155 indicates a pulse count of ten as does the control voltage pulse produced on the conductor 191. As another example, a positive voltage pulse appears on conductor 192 to provide an indication of 15 pulses when the diodes 176 and 187 are reverse biased. The diode 176 is reverse biased by a positive voltage appearing on conductor 76c from the accumulator terminal 155 indicating a partial pulse count of ten. The diode 187 is reverse biased when the diodes 177 and 178 are reverse biased by positive voltage pulses appearing on conductors 76a, 76b from the accumulator terminals 53, 54 indicating additional pulse counts of one and four respectively.

When the selector switches 71a–71i are moved to engage the fixed contacts 74a–74i, the MAS control selector 77 has its input connected to all of the output terminals 153–161 of the accumulator 60. The MAS selector is preferably also a multiple diode adding circuit similar to that in the phototimer control selector 75 with additional diode circuits to provide selection by fives between 5 and 500.

*Phototube current integrator and digitizer 51*

Figure 2:
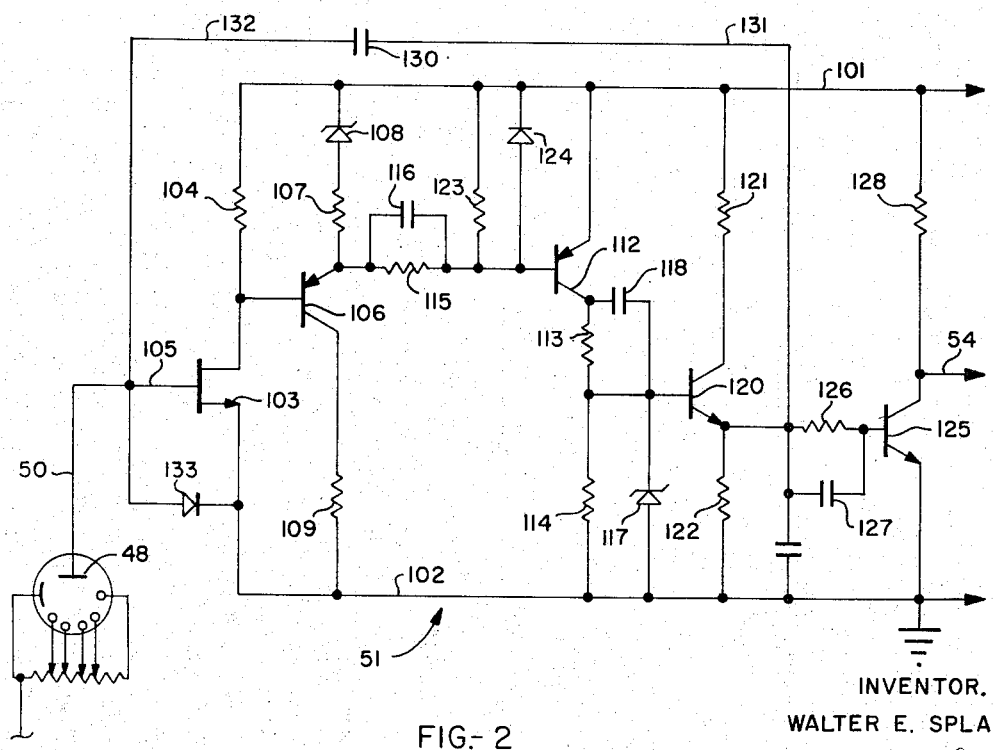
FIGURE 2 is a circuit diagram of the phototube current integrator and digitizer in the X-ray apparatus of FIGURE 1.

Referring to FIGURE 2, the phototube current integrator and digitizer 51 includes a supply circuit conductor 101 connected to a positive 24-volt DC supply and a ground potential circuit conductor 102 connected to a grounded connection. A field effect device 103 has its drain and source elements connected across the circuit conductors 101, 102 through a resistor 104. The field effect device 103 is a solid state device which is voltage controlled in a manner similar to vacuum tubes. In other words, the current between the source and drain of the field effect device 103 is proportional to the bias voltage applied to its gate element in the same manner as the bias voltage applied to the grid of a vacuum tube controls the current in the tube. The gate element of the field effect device 103 is connected to an input point 105 of the digitizer 51 and provides a high impedance input. A suitable field effect device may be described as an "N channel" and is designated as FE–400 by Amelco Semiconductors, Inc.

A control transistor 106 of the PNP type is connected across the conductors 101, 102 in an emitter-follower arrangement with its emitter connected to the conductor 101 through a resistor 107 and a Zener diode 108 and its collector connected to circuit conductor 102 through a resistor 109. The base of the transistor 106 is connected to the junction of the resistor 104 and the collector of the field effect device 103.

A capacitor charge and discharge control transistor 112 has its emitter tied directly to the circuit conductor 101 and its collector connected to the conductor 102 through voltage divider resistors 113, 114. The base of the PNP transistor 112 is connected to the emitter of the PNP transistor 106 through a resistor 115 and a regenerative cycle timing capacitor 116. A resistor 123 and a diode 124 connect the supply conductor 101 to the base of the transistor 112 to provide charge to the capacitor 116. A Zener diode 117 is connected to the collector circuit of the PNP transistor 112 from a point between the voltage divider resistors 113, 114 and has its anode element connected to the grounded conductor 102.

An NPN transistor 120 is arranged as an emitter-follower and has its collector connected to the supply conductor 101 through a resistor 121, its emitter connected to the ground potential conductor 102 via a resistor 122, and its base connected to the collector circuit of the transistor 112. A capacitor 118 is connected between the collector of the transistor 112 and the base of the transistor 120. The emitter of the transistor 120 is connected to the base of an amplifier transistor 125 through a resistor 126 and a capacitor 127. The collector of the transistor 125 is connected to the supply conductor 101 through a resistor 128. The emitter of the NPN transistor 125 is tied directly to the grounded conductor 102. The conductor 54 is connected directly to the collector of the NPN amplifier transistor 125 to provide the output for the phototube current integrator and digitizer 51.

A pulse or "bit" size determining capacitor 130 has one side (referred to herein as its circuit side) connected directly to the emitter of the emitter-follower transistor 120 via a conductor 131 and its other side (referred to herein as its field effect side) connected to the gate of the field effect device 103 via a conductor 132. A diode 133 has its anode connected to the base of the field effect device 103 and its cathode connected to the grounded conductor 102.

When current is supplied to the input point 105 from the anode of the photomultiplier tube, the base of the field effect device 103 is generally at a negative ten volts, being biased by the feedback from capacitor 130. During this circuit condition, the control transistor 106 has its base and its emitter tied to the +24 volt supply conductor 101 and is cut off. The transistor 112 is also cut off. With no current passing through the emitter-collector circuit of the transistor 112, the cathode side of the Zener diode 117 and consequently tthe base of the emitter-follower transistor 120 are tied to the ground conductor 102 and are at substantially ground or zero potential. The conductor 131 is also at substantially ground or zero potential through the emitter resistor 122 of the transistor 120. The conductor 132, however, is at the negative ten volts potential on the base of the field effect device 103.

When current is provided to the input point 105 by the photomultiplier tube, as when the X-ray tube 12 energized, the gate of the field effect device 103 is driven positively toward zero potential. When the gate of the field effective device is nearly at zero volts, approximately at a negative one volt, the emitter-collector circuit of the field effect device 103 begins to conduct current. This current conduction increases as its base moves closer to zero potential. The base of the field effect device 103 can never move beyond zero potential because of the clamping action of the diode 133.

As the field effect device 103 begins to conduct, the base-emitter junction of transistor 106 is forward-biased and the transistor 106 begins to conduct also. As the transistor 106 begins to conduct its emitter goes negative relative to the supply conductor 101 causing a change in charge of capacitor 116 resulting in a current flow in the now forward-biased base-emitter junction of transistor 112. The current flowing in the forward-biased base-emitter junction of transistor 112 will decay from an instantaneous high value related to the turning-on of transistor 106 to a near zero value in an exponential manner. Capacitor 116 is charged positively on its right side relative to its left side. In other words, the changing charge in the capacitor 116 is effectively "dumped" into the base emitter junction of the transistor 112 which forward biases the transistor 112. The forward biased transistor 112 begins to conduct so that its collecter goes more positive. The base and the emitter of the emitter-follower transistor 120 also move in a positive direction. The conductor 131, connected to the emitter of the transistor 120, also goes positively to place the circuit side of the capacitor 130 at a positive potential. This positive potential is reflected through the capacitor 130 to the base of the field effect device 103 to drive it further positively and cause increased current conduction in its source-drain circuit. The positive potential reflected by the capacitor 130 to the gate of the field effect device 103 sets up a regenerative cycle through the field effect device 103 and the transistors 106, 112 which continues to increase current conduction in the transistors 106, 112 until the base of the transistor 120 reaches a positive ten volts potential. An increase above ten volts is prevented by the Zener diode 117 which has a voltage breakdown value of ten volts. The ten volts potential is provided to the conductor 131 by the emitter-follower action of transistor 120 and, hence, to the circuit side of the capacitor 130.

The circuit side of the capacitor 130 remains at the positive 10 volts potential and the input side of the capacitor 130 remains at the zero volts potential for the period that the transistor 112 is forward biased and the conductor is at a positive voltage potential due to the voltage limiting action of diode 133. The transistor 112 is forward biased only for the period that current flows from the capacitor 116. In other words, at the time the current in the capacitor decays to substantially a zero value, the discharge path of the capacitor 116 being through diode 124, Zener diode 108, and resistor 107, the current is no longer being "dumped" into the base of the transistor 112 and the transistor 112 is cut off. The emitter of the transistor 120 is then nearly at ground potential so that the conductor 131 is effectively connected to ground through the small resistor 122 and the circuit side of the capacitor 130 is therefore substantially at ground potential. Since the field effect side of the capacitor 130 is connected to the very high impedance base of the field effect device 103, the field effect side of the capacitor 130 goes from zero volts to a minus 10 volts when the circuit side of the capacitor 130 goes from a positive ten volts to zero volts. When the field effect device 103 is cut off, Zener diode 108 insures that the base-emitter junction of transistor 106 is reverse-biased. Thus, capacitor 130 is charged by the current from photomultiplier tube 44 and is subsequently discharged by the regenerative action of the circuit as an output pulse.

The digitizer circuit 51 sits in this condition with the gate of the field effect device 103 at a negative ten volts until the phototube passes sufficient current to the base of the field effect device 103 to again drive it to nearly zero potential at which point the transistors 106 and 112 are again forward biased to cause the circuit side of the capacitor 130 to go positive and set up the regenerative cycle for the period determined by the timing capacitor 116.

Thus the voltage on the conductor 131 changes alternately from zero potential to a positive ten volts as long as current is supplied to the base of the field effect device 103 from the photomultiplier tube 44. The voltage changes are in pulse form and are amplified by the transistor amplifier 125 and introduced to the output conductor 54. The amplitude or height of the output signal pulses or "bits" is constant for all photomultiplier tube 44 current rates. The duration of the output pulses or bits is determined by the period of the regenerative cycle as controlled by the timing capacitor 116. In the present system, the regenerative cycle time is kept extremely short and is on the order of .5 microsecond. The spacing between the output pulses or bits will depend upon the amount of current being fed to the base of the field effect device 103 from the anode of the photomultiplier tube 44. The system shown has a capability of one million bits or pulses per second. The system is able to work over a current range of a million to one and is accurate throughout.

*Operation*

In the X-ray exposure to be made utilizing a MAS method of control, the selector switch contacts 71a–71i are set to engage the fixed contacts 74a–74i and the movable selector switch contact 56 is moved to engage fixed contact 32 to connect the MAS digitizer 30 to the input of the accumulator 60 and the output of the accumulator 60 to the MAS control selector 77. If a phototiming method of control is used, then the movable contact 56 is set to engage fixed contact 55 and the movable contacts 71a–71h are set to engage fixed contacts 73a–73i so that the output of the phototimer digitizer 51 is connected to the input of the accumulator 60 and the output of the accumulator 60 is connected to the input of the phototimer selector 75. For purposes of explanation of the operation of the present overall system, it is assumed that the phototimer system is to be used so that the selector switches 71, 56 are moved to their solid line positions shown.

The desired kilovoltage level for the exposure is set by adjusting the position of the autotransformer terminal 15. The selector switch 200 is set at the desired density setting which is usually 20. The power supplies e and E having been turned on, the control switch 67 is closed to energize the contactor coil 20 from the voltage source E. The coil 20 closes its contacts 18, 19 to supply voltage to the primary winding of the high voltage step-up transformer 17. The transformer steps up the voltage to set kilovoltage level for operating the X-ray 12. The X-ray tube 12 is energized and provides X-rays to the subject 35. As is conventional, the X-rays passing through the subject expose the film 39 and activate the fluorescent screen 45. The fluorescent screen 45 provides light to the photomultiplier tube 44. The photomultiplier tube 44 provides an output current from its anode 48 to the phototimer integrator and digitizer 51 via the conductor 50. The phototimer digitizer integrates the phototube current with respect to time and provides a plurality of output signal pulses on its output conductor 54. Each signal pulse represents an identical phototube current-time integral. The pulses from the digitizer 51 are fed to the input of the accumulator 60 via conductor 54, contacts 55, 56 and conductor 57. The accumulator counts the signal pulses and provides pulse count voltage signals at those of outputs 153–161 which will have the pulse count values which may be added to provide a count of the total number of pulses thus far produced by the phototube current digitizer 51 in counts by five. The current adder system in the phototimer selector 75 adds the pulse count values of the pulse count voltage signals produced by the accumulator output terminals and provides output control signals sequentially to the selector terminal conductors 191–197 at each of the five pulse count positions starting with a pulse count of ten as the counting progresses. When the counting progresses to the terminal conductor at which the selector switch 200 is positioned (conductor 193 for a 20 pulse count setting) the control signal pulse provided to such terminal conductor energizes the control relay 63 via conductors 80, 82. The energized relay 63 opens its contacts 64 to de-energize contactor coil 20. The de-energized contactor coil 20 permits its contacts 18, 19 to open by means of a suitable bias, e.g., gravity. The opened contacts 18, 19 de-energize the X-ray tube 12 to terminate the exposure. The control voltage signal provided to the conductor 80 by the phototimer selector 75 is also introduced via the conductor 61 to reset input of the accumulator 60 to reset the accumulator 60 to zero. The accumulator 60 is then in position to begin another pulse count for the next exposure.

What is claimed is:

1. In an X-ray apparatus for providing X-rays from an X-ray source to a subject to be X-rayed and to a film positioned behind the subject, a system for properly exposing the film, said system comprising:
    (a) supply circuit means connecting the X-ray source to an energizing supply;
    (b) X-ray responsive means disposed adjacent the film and providing an output indication of the quantity of X-rays impinging the film;
    (c) integrating circuit means connected to the X-ray responsive means and integrating said output;
    (d) digitizing circuit means connected to said integrating circuit means and forming a successive train of pulses from the integrated output;
    (e) pulse responsive means connected to said digitizing means and providing an exposure termination signal when a predetermined plurality of pulses are produced by the digitizing circuit means; and,
    (f) control means connected to said supply circuit means and to said pulse responsive means and disconnecting the X-ray source from the energizing supply in response to the exposure termination signal provided by the pulse responsive means.

2. In an X-ray apparatus for providing X-rays from an X-ray source to a subject to be X-rayed and to a film positioned behind the subject, a system for properly exposing the film, said system comprising:
    (a) supply circuit means connecting the X-ray source to an energizing supply;
    (b) a fluorescent screen disposed adjacent the film;
    (c) a phototube device disposed adjacent the fluorescent screen to receive a light output of the screen;
    (d) integrating circuit means connected to the phototube and integrating the current output of the phototube as it is supplied by the phototube;
    (e) digitizing circuit means connected to said integratin circuit means and digitizing the integrated output is integrated to provide a successive train of pulses, each pulse representing an identical predetermined portion of the integrated output which portion is substantially less than the total integrated output produced during a single exposure;
    (f) pulse counting means connected to said digitizing circuit means and providing an output signal in response to a predetermined number of pulses produced by the digitizing circuit means; and,
    (g) control circuit means connected to the supply circuit means and to the pulse counting means and disconnecting the X-ray source from the energizing supply in response to an output signal from the pulse counting means.

3. In an X-ray system having an X-ray tube connected to an energizing circuit and providing X-rays to a subject to be X-rayed and to a film positioned behind the subject in relation to the X-ray tube, a system for interrupting the energizing circuit at the termination of a desired exposure of the film, said system comprising:
  (a) X-ray responsive means disposed behind the film and producing an output indicative of the X-rays impinging the film;
  (b) first integrating and digitizing means connected to said X-ray responsive means and integrating the output of the X-ray responsive means and digitizing the integrated output signal to provide a successive train of output signal pulses each of which represents a predetermined degree of film exposure;
  (c) second integrating and digitizing means interposed in the energizing circuit and integrating the energizing current provided to the X-ray tube and digitizing such integrated energizing current to provide a successive train of pulses each of which represents a predetermined quantity in milliampere-seconds;
  (d) counting means selectively connectable to each of said integrating and digitizing means one at a time;
  (e) control means connected to said energizing circuit and to said counting means to interrupt said energizing circuit when the connected integrating and digitizing means provides a predetermined number of output pulses.

4. The system of claim 3 including:
  (f) first and second selectors corresponding to the first and second integrating and digitizing means respectively, each selector being selectively connectable to said control means and to the counting means when the corresponding integrating and digitizing means is connected to the counting means, said first selector being presettable to the number of pulses required to provide a predetermined film density, and said second selector being presettable to the number of pulses required to provide a total predetermined and preselected milliampere-second quantity.

5. The system of claim 4 including:
  (g) an interlock connected to said selectors and to the input of said counting means so that the first selector is connected to said counting means when said first integrating and digitizing means is connected to said counting menas and said second selector is connected to said counting means when said second integrating and digitizing means is connected to said counting means.

6. A system for measuring the proper exposure of an X-ray film comprising:
  (a) an X-ray responsive means disposed adjacent the film and providing an output indicative of the quantity of X-rays impinging the film;
  (b) integrating circuit means including a capacitor connected to the X-ray responsive means and integrating said output;
  (c) digitizing circuit means connected to said integrating circuit means comprising:
    (i) charging circuit means connected to said capacitor and charging said capacitor to a predetermined charge of a given polarity each time the capacity is discharged;
    (ii) circuit means connected to the capacitor and to the X-ray responsive means so as to supply the output of the X-ray responsive means in an opposite polarity to the capacitor to discharge the capacitor; and,
    (iii) indicating circuit means connected to said capacitor and providing a pulse each time the capacitor charges and discharges whereby the capacitor is charged and then discharged for the duration of the output produced by the X-ray responsive means so as to provide a successive train of pulses;
  (d) pulse responsive means connected to said digitizing means and providing an exposure termination indication when a predetermined plurality of pulses are produced by said digitizing circuit means.

7. A system for measuring the proper exposure of an X-ray film comprising:
  (a) an X-ray responsive means disposed adjacent the film and providing an output indicative of the quantity of X-rays impinging the film;
  (b) integrating circuit means including a capacitor connected to the X-ray responsive means and integrating said output;
  (c) digitizing circuit means connected to said integrating circuit means comprising:
    (i) a first control device having a high impedance biasing element connected to the output of the X-ray responsive means, said control device having circuit elements forming a conductive circuit in response to a predetermined biasing level applied to its biasing element;
    (ii) a second switching device having a control element, and circuit elements forming a conductive circuit when a bias of a predetermined level is applied to the control element, said circuit elements being connected to a power supply and to the other side of the capacitor to selectively connect the other side of the capacitor from an isolated position to the power supply;
    (iii) circuit means connecting the circuit elements of the first switching device to the control element of said second switching device to cause said second switching device to connect said other side of the capacitor from the isolated position to the power supply each time the bias on the control element of the first switching device reaches said predetermined level and causing said second switching device to disconnect said capacitor from the power supply and connected back to the isolated position after a predetermined interval; and,
    (iv) pulse forming means connected to said capacitor and producing a pulse for each charge and discharge of the capacitor;
  (d) pulse responsive means connected to said digitizing circuit means and providing an exposure termination indication when a predetermined plurality of pulses are produced by said digitizing circuit means.

8. A system for measuring the proper exposure of an X-ray film comprising:
  (a) an X-ray responsive means disposed adjacent the film and providing an output indicative of the quantity of X-rays impinging the film;
  (b) integrating circuit means including a capacitor connected to the X-ray responsive means and integrating said output;
  (c) digitizing circuit means connected to said integrating circuit means comprising:
    (i) charging circuit means connected to said capacitor and charging said capacitor to a predetermined charge of a given polarity each time the capacitor is discharged;
    (ii) circuit means connected to the capacitor and to the X-ray responsive means so as to supply the output of the X-ray responsive means in an opposite polarity to the capacitor to discharge the capacitor; and,
    (iii) indicating circuit means connected to said capacitor and providing a pulse each time the capacitor charges and discharges whereby the capacitor is charged and then discharged for the duration of the output produced by the X-ray responsive means so as to provide a successive train of pulses;
  (d) pulse responsive means connected to said digitizing means and providing an exposure termination indication when a predetermined plurality of pulses are produced by said digitizing circuit means, said pulse responsive means including:

(i) an accumulator device having a plurality of outputs, each output indicating a different total number of pulses received from the digitizer circuit means;
(ii) a selector selectively connectable to said outputs one at a time; and,
(iii) a control element connected to the selector and providing the exposure termination indication each time an output signal appears at the accumulator device output to which the selector is connected.

9. A system for measuring the proper exposure of an X-ray film comprising:
(a) an X-ray responsive means disposed adjacent the film and providing an output indicative of the quantity of X-rays impinging the film;
(b) integrating circuit means including a capacitor connected to the X-ray responsive means and integrating said output;
(c) digitizing circuit means connected to said integrating circuit means comprising.
    (i) charging circuit means connected to said capacitor and charging said capacitor to a predetermined charge of a given polarity each time the capacitor is discharged;
    (ii) circuit means connected to the capacitor and to the X-ray responsive means so as to supply the output of the X-ray responsive means in an opposite polarity to the capacitor to discharge the capacitor; and,
    (iii) indicating circuit means connected to said capacitor and providing a pulse each time the capacitor charges and discharges whereby the capacitor is charged and then discharged for the duration of the output produced by the X-ray responsive means so as to provide a successive train of pulses;
(d) pulse responsive means connected to said digitizing means and providing an exposure termination indication when a predetermined plurality of pulses are produced by said digitizing circuit means, said pulse responsive means including:
    (i) a plurality of flip-flops interconnected as a counter having an input connected to the digitizer circuit means and a plurality of outputs, one from each of said flip-flops;
    (ii) a multiple current adder circuit means connected to the outputs of the counter and having a plurality of outputs each providing an output signal for a different total number of pulses produced by the digitizer; and,
    (iii) a selector switch selectively connectable to the current adder outputs one at a time and providing the exposure termination indication each time a signal appears at the current adder output to which it is connected.

10. The system of claim 9 wherein the outputs of the adder circuit means have weighted pulse count values at five pulse count intervals.

11. The method of measuring the exposure of an X-ray film disposed behind a subject being X-ray from a source of X-rays, said method comprising:
(a) determining the quantity of X-rays impinging the film during an exposure and providing an output signal which is indicative of this quantity;
(b) integrating the output with respect to time;
(c) forming the integrated output into a plurality of successive output pulses, the portion of the integrated output represented by a single pulse being substantially less than the integrated output to be produced during exposure of the film to a predetermined density; and,
(d) counting the pulses and causing the exposure to continue for the duration of the number of pulses required to produce said predetermined density.

12. The method of claim 11 wherein said output signal is formed into the output pulses substantially simultaneously with the integration in that the portion of the output represented by a pulse is integrated and produced as a pulse prior to integrating that portion of the output represented by a succeeding pulse.

13. A system for integrating and digitizing current comprising:
(a) a capacitor having one side connected to an input of the system;
(b) a first switching device having a high impedance biasing element connected to said input, said switching device having circuit elements forming a conductive circuit in response to a predetermined biasing level applied to its biasing element;
(c) a second switching device having a control element, and circuit elements forming a conductive circuit when a bias of a predetermined level is applied to the control element, said circuit elements being connected to a power supply and to the other side of the capacitor to selectively connect the other side of the capacitor from an isolated position to the power supply; and
(d) circuit means connecting the circuit elements of the first switching device to the control element of the second switching device to cause said second switching device to connect said other side of the capacitor from an isolated position to the power supply each time the bias on the control element of the first switching device reaches said predetermined level and causing said second switching device to disconnect said capacitor from the power supply and connect it back to an isolated position after a predetermined interval.

14. The system of claim 13 wherein the predetermined interval provided by the circuit means is at least the period required for the capacitor to charge to the level of the connected supply.

15. The system of claim 13 including:
(a) a unidirectional current device connecting said input to a ground potential circuit conductor to prevent the level of the bias provided to the control element of the first switching device to go beyond the ground potential of said circuit conductor.

16. A device for integrating and digitizing a current output comprising:
(a) a capacitor having one side connected to an input of the device which input receives a positive current;
(b) a field effect device having a gate electrode connected to the input of hte device to provide a high impedance input, and source and drain electrodes forming a conductive circuit when the base electrode is biased positively to near zero potential;
(c) a first transistor having base, collector and emitter electrodes, said transistor having conductive and non-conductive states, said emitter and collector electrodes connecting the other side of said capacitor to a conductor near ground potential when the bias applied to the base electrode places the transistor in one such state and to a power supply when the bias applied to said base electrode causes said transistor to go from said one state to the other state;
(d) circuit means connecting the source and drain electrodes of the field effect device to the base of the first transistor to cause said first transistor to connect said capacitor from said conductor to said power supply when the bias on the base electrode of the field effect device goes positively near zero potential;
(e) said circuit means including a timing element to maintain the other side of the capacitor connected to said power supply until that side of the capacitor is at said power supply potential and then disconnecting said capacitor from said power supply and reconnecting it to the said conductor whereby when the other side of said capacitor is connected to said conductor, said one side of said capacitor is at a negative charge and drives the base of the field effect device negatively to shut off said field effect device until sufficient additional current supplied to the input again drives the base electrode positively to near zero potential;

(f) the positive current being introduced to the input of the device effectively discharging the negative charge on the capacitor; and, (g) output indicating circuit means connected to said capacitor to provide an output signal pulse each time the capacitor charges and discharges.

References Cited

UNITED STATES PATENTS

| | | | |
|---|---|---|---|
| 2,516,422 | 7/1950 | Rockafellow | 328—77 |
| 2,821,635 | 1/1958 | Ball et al. | 250—95 |
| 2,985,761 | 5/1961 | Ohmart | 250—95 |
| 3,185,844 | 5/1965 | Bess | 250—83.6 |
| 3,223,843 | 12/1965 | Westerkowsky | 250—95 |

FOREIGN PATENTS 931,720  7/1963  Great Britain.

RALPH G. NILSON, *Primary Examiner.*

A. L. BIRCH, *Assistant Examiner.*